United States Patent [19]

Martin et al.

[11] 4,336,748

[45] Jun. 29, 1982

[54] FLUID EXCHANGER

[75] Inventors: Stanley I. Martin, Ailsa Craig;
Edward J. Martin, Ballinafad, both of Canada

[73] Assignee: Axis Products Limited, Ballinafad, Canada

[21] Appl. No.: 213,465

[22] Filed: Dec. 5, 1980

Related U.S. Application Data

[63] Continuation-in-part of Ser. No. 74,241, Sep. 30, 1979, abandoned.

[51] Int. Cl.³ ............................................. F24F 13/00
[52] U.S. Cl. ....................................... 98/33 A; 98/35;
137/563
[58] Field of Search ................ 98/33 R, 33 A, 35, 62, 98/94, 116; 137/563, 566, 597

[56] References Cited

U.S. PATENT DOCUMENTS

| | | | |
|---|---|---|---|
| 1,584,002 | 5/1926 | Aeby et al. ............................ | 137/563 |
| 2,594,688 | 4/1952 | Shapiro ................................ | 98/94 X |
| 3,302,548 | 2/1967 | Kohlmeyer ........................... | 98/33 R |
| 3,433,295 | 3/1969 | Avery ................................ | 98/33 R X |
| 3,463,391 | 8/1969 | Haegens ........................... | 98/33 R X |
| 3,750,557 | 8/1973 | Peill et al. ........................... | 98/35 X |
| 4,079,665 | 3/1978 | Martin ............................ | 98/33 A X |

FOREIGN PATENT DOCUMENTS

| | | | |
|---|---|---|---|
| 2149173 | 4/1972 | Fed. Rep. of Germany ..... | 98/33 A |
| 1218530 | 1/1971 | United Kingdom ............... | 98/33 R |

*Primary Examiner*—Albert J. Makay
*Assistant Examiner*—Harold Joyce
*Attorney, Agent, or Firm*—George A. Rolston; William F. Frank

[57] ABSTRACT

Exchanger means for exchanging a first fluid with a second fluid, in varying proportions and employs a first duct, carrying the first fluid, a second duct carrying the second fluid, and a transfer chamber connected to both ducts, through which some, or all of the second fluid is able to be transferred back into the first duct, and variable control means in the form of first and second damper blade means in the chamber which can be swung together, thus dividing the chamber and preventing transfer, and which may be swung apart to procure varying proportions of such transfer. The chamber also has inlet means for inlet of the first fluid and outlet means for discharge of the second fluid.

9 Claims, 6 Drawing Figures

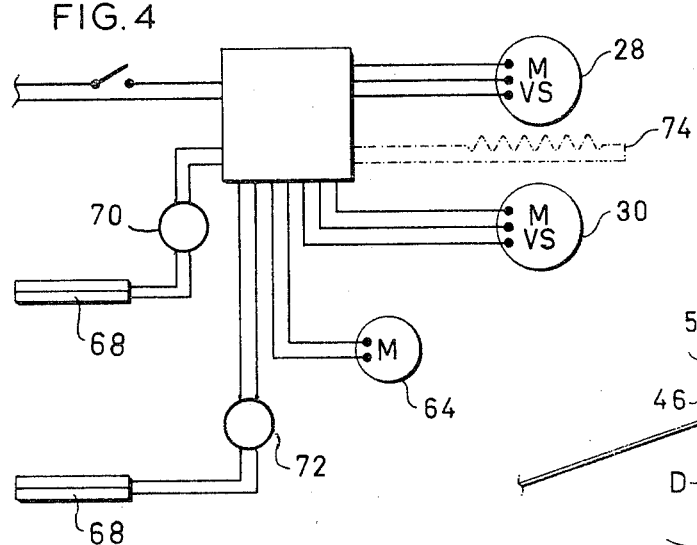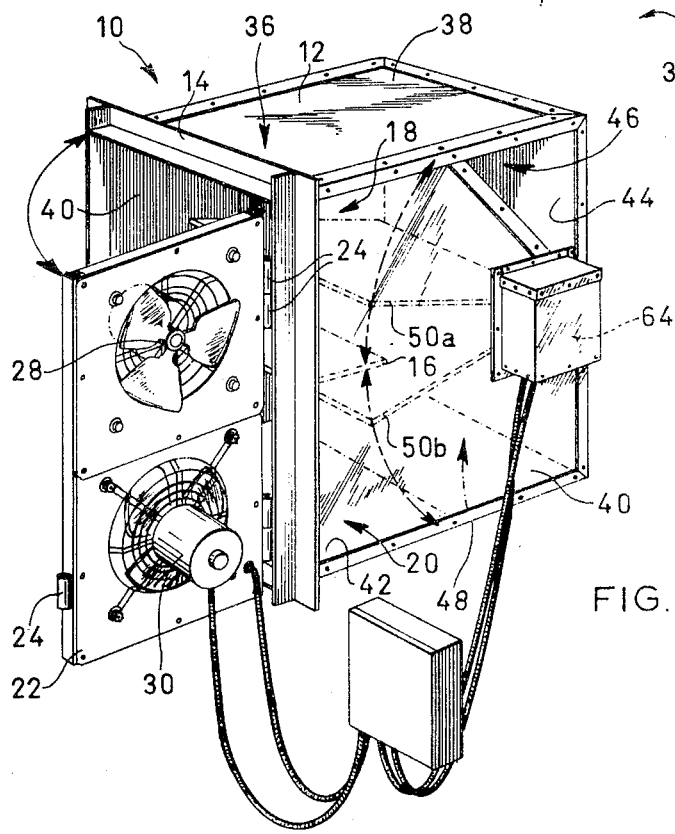

4,336,748

FLUID EXCHANGER

This application is a continuation-in-part of U.S. application Ser. No. 074,241 filed Sept. 30, 1979 now abandoned, entitled "Ventilator".

This invention relates to means for exchanging one fluid with varying proportions of another fluid, and is of particular utility as a ventilator for large buildings such as barns, and industrial buildings.

BACKGROUND OF THE INVENTION

The exchanging of one fluid with another is required in a wide variety of situations, such as liquid tanks, chemical processes involving liquids and gases, and in many types of different ventilation applications. The liquid or gas content in a given space ie in a tank, chamber, retort, or building space, usually is kept within a given range of temperature, gas content, or the like, condition. In order to maintain such condition a first fluid is added, and some of the contents (the second fluid) is removed, in varying proportions.

For many reasons it is desirable to carry out all three functions, ie exhausting the second fluid, introducing the first fluid, and mixing of both fluids, by means of a single piece of apparatus.

For example the installation of forced ventilation for existing buildings such as barns and industrial buildings presents certain problems. In the first place, such buildings are built of a wide variety of materials, and with widely different designs. In many cases such buildings were not originally intended for their present purpose. In particular the housing of livestock requires the installation of ventilation. However such ventilation as has been provided in the past has been unsatisfactory in many cases. Air circulation should extend throughout the full extent of the floor area of the building. If air circulation is localized, or concentrated in certain specific areas, for example, around the ventilators themselves, then the livestock will tend to congregate there, and may injure themselves. On the other hand livestock located in parts of the building which are poorly ventilated, may become ill, due to over heating, stagnating air and the like.

In U.S. Pat. No. 4,079,665, there is proposed a ventilator which overcomes many of these disadvantages. However, it was relatively expensive to manufacture, and did not operate effectively in all weather conditions. In particular it was found to ice up during cold weather. In addition, it was relatively difficult to service and repair.

BRIEF SUMMARY OF THE INVENTION

The general concept of the invention provides a means for exchanging a first fluid with a second fluid, in varying proportions and employs a first duct, carrying the first fluid and a second duct carrying the second fluid, and a transfer chamber connected to both ducts, through which some, or all of the second fluid is able to be transferred back into the first duct, and variable control means in the form of first and second damper blade means in the chamber which can be swung together, thus dividing the chamber and preventing transfer, and which may be swung apart to procure varying proportions of such transfer. The chamber also has inlet means for inlet of the first fluid and outlet means for discharge of the second fluid.

When used as a ventilator for barns and the like, there is provided a generally rectangular housing, containing duct work, adapted to fit through a wall or roof of the building, and having an inside and an outside end, and having on the inside end of the building an intake fan drawing air inwardly, and an outlet fan drawing air from the interior of the building, and having on the outer end of the housing a transfer chamber, with air outlet opening means on one side of said chamber, and air intake opening means on the other side of said chamber, and having a two part damper means movably mounted within the transfer chamber, and being swingable towards and away from one another, and linkage means interconnecting said two-part damper whereby the same move in unison in opposite directions, and power operated means for moving said two-part damper means.

The invention further provides such a ventilator wherein the two-part damper means comprise two damper blades, swingably mounted along adjacent free edges, their swinging axes being spaced apart parallel to one another, with their free edges being directed towards the housing and duct work, so that when swung together, they lie parallel side by side substantially dividing said transfer chamber into two parallel ducts, and, when swung open, they return building air back into the building.

The invention further provides a ventilator having a mounting frame, with the two fan means and motor means therefore mounted on said mounting frame, and said mounting frame being movably connected to said housing, whereby said mounting frame may be moved relative to said housing for servicing of said ventilator.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 3 is a partial perspective illustration showing the fan portion of the apparatus swung away from the remainder;

FIG. 4 is a schematic circuit diagram;

FIG. 5 is a schematic illustration showing an alternate use of the invention, and, FIG. 6 is a schematic illustration of an alternate embodiment of exchanger.

DESCRIPTION OF A SPECIFIC EMBODIMENT

As explained above, while the invention takes many forms, and has numerous applications, it is illustrated here in the form of a ventilator for large buildings such as industrial buildings sporting arenas, and agricultural buildings.

Figure 1:
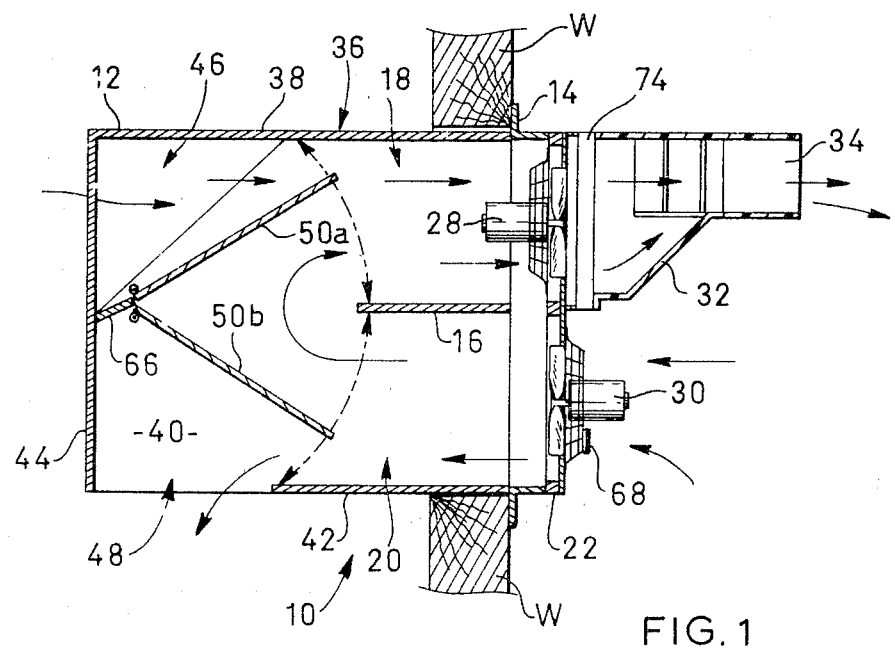
FIG. 1 is a sectional side elevation of an exchanger, namely a ventilator, according to the invention.

Referring now to FIG. 1, the ventilator 10 according to the invention will be seen to comprise a generally rectangular housing 12, mounted in a suitable rectangular opening in a wall W, At the inner end of the housing 12 there is a frame 14, by means of which it may be fastened on the interior surface of wall W, within the building interior.

Within the housing 12, there is a horizontal partition wall 16 dividing housing 12 into an upper duct 18 and a lower duct 20.

Fastened at the inner end of housing 12, to the frame 14, is a mounting frame assembly 22. Mounting frame 22 is of generally rectangular construction, and has a horizontal cross member more or less in the form of a letter H.

It is movably mounted on the frame 14 by any suitable means. In this embodiment of the invention, such means comprise hinges 24 and lock 26 on the opposite side of frame 22.

In this way, when the lock 26 is released, mounting frame 22 may be swung away to one side of the frame 14 on housing 12.

An intake fan and associated motor, is mounted on the upper portion of mounting frame 22, and an outlet fan and associated motor 30 is mounted on the lower portion of mounting frame 22. The fans 28, 30 are operated to drive air in opposite directions.

A generally funnel-shaped duct section 32 is mounted on the upper portion of mounting frame 22 in registration with intake fan 28, and having generally fan-shaped outlet nozzles 34.

It will also be noted that housing 12 is fastened within frame 14 in a slightly downward angled orientation. In this way, when frame 14 is mounted plumb on the inside of the wall, the upper surface of the housing 12 will be angled downwardly. In this way any rain or precipitation falling on housing 12 will tend to shed outside the building.

On the outer end of housing 12, a transfer chamber 36 is provided. In the case of FIG. 1, the transfer chamber 36 is simply constituted by extensions of the walls forming housing 12. It will however, of course, be appreciated that where the wall W is thicker, or where for example it may be desirable to connect duct work between housing 12 and the chamber 36, then they will be made as separate units, and may be joined by any suitable attachment means, on site during assembly.

The transfer chamber 36 consists of an upper wall 38, two side walls 40, a lower wall 42 and an end wall 44.

A pair of generally triangular inlet openings 46 are provided in side walls 40, on the upper outer corners thereof.

An outlet opening 48 is provided in bottom wall 42, directed downwardly, and located towards the outer end thereof.

Figure 2:
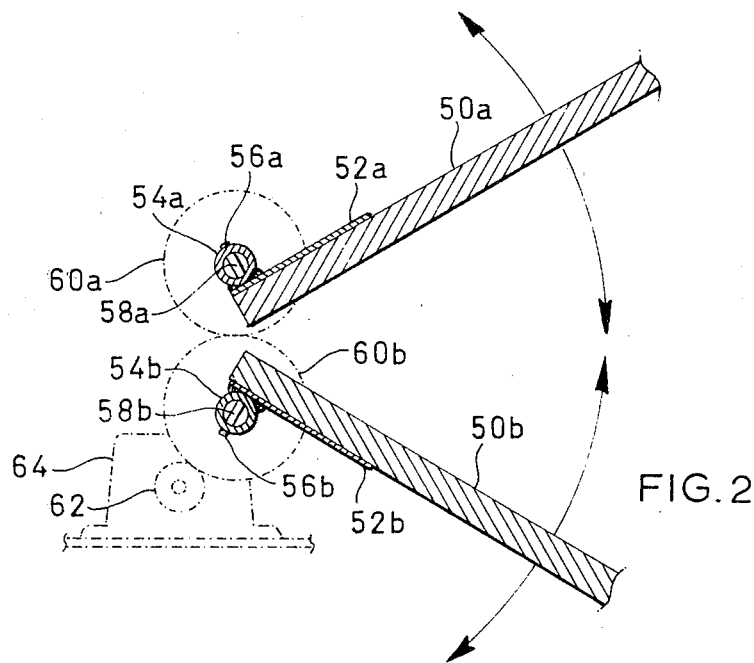
FIG. 2 is a greatly enlarged sectional side elevation showing details of the damper means.

Within transfer chamber 36 a pair of movable damper blades namely upper damper blade 50a and lower damper blade 50b are provided, and are mounted in a swingable manner as will be seen in more detail in FIG. 2.

Damper blades 50a and 50b are mounted on respective mounting brackets 52a, 52b which are in turn fastened for example by welding, to transverse hollow cylindrical sleeves 54a, 54b provided with grub screws 56a, 56b.

Sleeves 54a and b are themselves mounted on respective drive shafts 58a, 58b, and are fastened thereto by their respective grub screws 56a and b. The drive shafts 58a-b are journaled in suitable journals in opposite side walls 40 of transfer chamber 36. On one such side wall 40, the drive shafts 50a and b extend completely through the side, and are provided with identical meshing gears 60a, 60b. Gears 60a-b mesh so that the two damper blades 50a-b may be swung towards or away from one another in unison, but cannot be swung independently of one another.

One of gears 60a-b is itself driven by a drive gear 62 and associated drive motor 64, mounted on a suitable mounting (on the exterior of side wall 40).

Damper blades 50a-b extend completely across from side wall to side wall of chamber 36, and are sufficiently long they just overlap the free edge of partition 16 of housing 12.

The small space between back wall 44 and the inward edges of damper blade 50a-b is closed off by means of a downwardly angled partition 66.

Two separate thermostats are attached adjacent to the outlet fan 30, being shown simply as 68. It will, of course, be appreciated two such thermostats are in fact incorporated, although they are not shown separately. Preferably they are suitably insulated from the metal of the cage surrounding fan 30 so that they provide a true reading of the air passing through fan 30 rather than the temperature of the metal surrounding it.

As shown in the circuit diagram of FIG. 4, the two thermostats or thermo-sensitive devices 68 are connected to two separate adjustable thermostat controls 70 and 72.

Thermostat control 70 is connected to control the fans 28 and 30, and thermostat control 72 is connected to control motor 64. Preferably, the motors of fans 28 and 30 are multi-winding motors so that they may run at two speeds i.e. intermediate speed and a top speed, or if desired, a greater number of different speeds may be provided. Motor 64 is so controlled that it will set the damper blades 50a-b in any desired position, ranging from fully open to fully closed.

In operation, when the damper blades 50a-b are closed i.e. are rotated so that they are lying parallel against the partition 16, fresh air will be drawn in through openings 46, by fan 28, and will be ejected into the injector of the building through nozzles 34.

Simultaneously, air from within the building, will be withdrawn by fan 30 and ejected through opening 48.

Normally, in this mode, the fan motors for fans 28 and 30 will be operating at top speed, so as to produce a maximum continuous air change within the building. This would normally be the condition on a summer day.

When damper blades 50a-b are rotated fully open, they will contact the upper wall 38 and lower wall 42 respectively of chamber 36, thereby completely shutting off openings 46 and 48.

In this mode of operation, air will be withdrawn from within the interior of the building by fan 30, and will pass along duct 20 and will then strike damper blade 50b and will be directed upwardly against damper blade 50a. Air will then be drawn back into the building by fan 28, and ejected through nozzles 34.

In this mode of operation, there will be no fresh air inducted and no building air exhausted outside the building. There will simply be a continuous circulation of building air.

This mode of operation would not normally be experienced continuously for any great length of time even on a cold day in winter. Body heat from the animals will quite quickly raise the air temperature within the building. In practice damper blades 50a, 50b will normally operate somewhere between the fully open and fully closed positions described above.

In such an intermediate position, some fresh air will be inducted through openings 46 and some building air will be ejected through opening 48, and some building air will be recycled by means of a passing upwardly through chamber 36, and will be recycled back into the building.

Normally, in this intermediate mode of operation, the fan motors for fans 28 and 30 will be running at a lower speed. However, the transition between low speed and high speed operation of the fans will be dependent upon the adjustment of thermostat control 70, and may be selected by the individual owner.

If desired, in extreme climates, some additional form of heating may be provided in the form of the heater unit 74 which may be located in front of fan 28, and controlled by any other suitable thermostats (not shown), such as are well-known in the art. Preferably, such thermostat controls will provide for several levels of heating depending upon the temperature of the incoming air to provide a fully flexible mode of operation.

It will, of course, be appreciated that the transfer chamber 36 of the invention may be utilized in somewhat different layouts. For example, it is sometimes desirable to provide for ventilation through a roof instead of through a wall. In other situations it is desirable for a greater length of duct work between the housing 12 and the transfer chamber 36.

In the embodiment shown in FIG. 1, the transfer chamber 36 is essentially simply an endwise extension of the housing 12.

However, where greater length of duct work is required, then for example the housing 12 and transfer chamber 36 could be made in separate portions, being divided for example along the chain dotted line L, and lengths of duct work could be connected therein, thereby enabling for example the housing 12 to be located inside the building on a wall, with a length of duct work extending up the wall, and then passing through a wall to the exterior of the building at some other location.

Referring now to FIG. 5, it will also be observed that the transfer chamber 36 can be used for a roof mounted ventilator, the transfer chamber 36 simply being shown rotated 90° and being mounted on the upper end of vertical duct work d.

Figure 6:
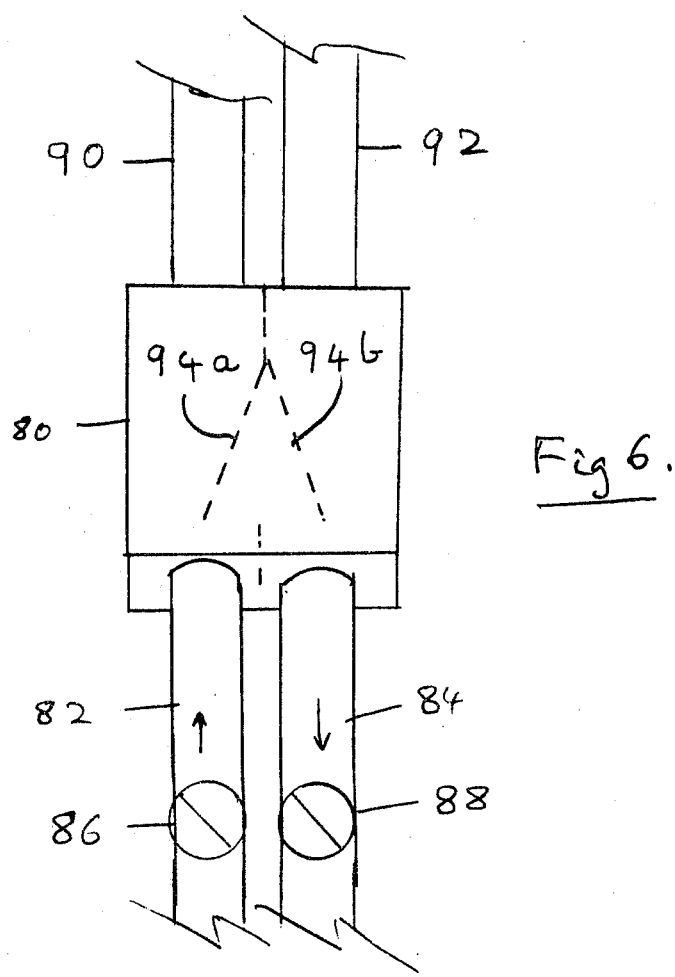

As shown in FIG. 6 the invention is applicable to a variety of different situations for exchanging and mixing fluids in varying proportions.

In the embodiment housing 80 is connected at one side or end to a first fluid supply duct 82 and a second fluid extraction duct 84. Ducts 82 and 84 may be connected to any type of container, chamber, or space, for exchanging the fluid content thereof. Pumps or fans 86 and 88 are provided for procuring flow in such ducts 82-84.

A first fluid intake duct 90, and a second fluid exhaust duct 92, are connected to the opposite side or end of housing 80.

Damper guide blades 94a and 94b (shown in phantom) are provided in housing 80, and operate in essentially the same manner as blades 50a-50b in the embodiment of FIG. 1.

Duct 90 connects to any suitable source (not shown) of the first fluid, and duct 92 connects to any means (not shown) for receiving the second fluid. This of course may be simply discharging to atmosphere, as in FIG. 1. Alternatively it may be any means for disposing of, or recycling, or cleansing, or processing the second fluid.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. Exchanger means for exchanging a first fluid with a second fluid in varying proportions, and comprising;

ducting means defining first and second ducts arranged side by side and having spaced apart axes, said ducting means having a first end and a second end;

first fluid moving means communicating with said first duct for drawing said first fluid inwardly through said duct from said outer end to said inner end;

second fluid moving means communicating with said second duct, for drawing said second fluid through said second duct from said inner end to said outer end;

transfer chamber means to which said first duct and said second duct are connected on spaced apart axes, said chamber means being adapted for transferring varying proportions of said second fluid from said second duct back into said first duct;

outlet means communicating with one portion of said transfer chamber means for discharge of said second fluid therefrom;

inlet means communicating with another portion of said transfer chamber for inlet thereto of said first fluid;

first and second damper blade means movably mounted within said transfer chamber means;

swingable mounting means mounting said blade means along adjacent edges, with their swinging axes being spaced apart and parallel to one another and located between said inlet and outlet means in said chamber means, and with their opposite edges being free and directed towards said ducts, said damper blade means, when swung together lying parallel side by side in closely overlying relation and forming partition means, substantially dividing said transfer chamber means into two parallel duct extensions constituting endwise extensions of said first and second ducts, whereby transfer of fluid from one said duct to the other is substantially eliminated, and, when swung apart, said first blade means moves into the path of said first duct and said second blade means moves into the path of said second duct thereby causing transfer of at least some of said second fluid from said second duct back into said first duct;

linkage means interconnecting said damper blade means whereby the same move in unision in opposite directions, and, power operated means connected with said damper blade means for moving the same.

2. Exchanger means as claimed in claim 1 wherein said swingable mounting means comprised a parallel spaced apart shafts, and wherein said linkage means comprises gears mounted on respective shafts, in meshing engagement.

3. Exchanger means as claimed in claim 2 wherein said transfer chamber means comprises a rectangular box-like structure with said inlet means in an upper portion of said box-like structure, and said outlet means in a lower portion of said box-like structure.

4. Exchanger means as claimed in claim 3 including partition wall means in said chamber means, between said first and second ducts, partially dividing said chamber means and wherein said damper blade means are mounted adjacent to an end wall of said box-like structure, and extend therefrom, when in their parallel side by side position, into overlapping relation with said partition wall means.

5. Exchanger means as claimed in claim 1 wherein said fluids are liquids, and wherein said first and second fluid moving means are pumps.

6. Exchanger means as claimed in claim 1 wherein said fluids are gases, and wherein said first and second fluid moving means are fans.

7. A vent means for buildings and the like said means comprising:
- ducting means defining separate first and second ducts side by side and having spaced apart parallel axes and having inside and outside ends;
- a fan mounting frame means attached on the inside end of said ducting means, and being releasably movable relative thereto;
- inlet fan means mounted on said frame means in communication with said first duct for introducing air into said building;
- outlet fan means mounted on said frame means in communication with said second duct for drawing air from the interior of said building through said second duct;
- transfer chamber means communicating with the outer end of said ducting means;
- air intake means communicating with one portion of said transfer chamber means for admitting fresh atmospheric air;
- air outlet means communicating with another portion of said transfer chamber means for discharge of air therefrom, said transfer chamber means communicating with both said ducts of said housing means and permitting transfer of air from one duct to the other;
- first and second damper blade means moveably mounted within said transfer chamber means;
- swingable mounting means mounting said blade means along adjacent edges, with their swinging axes being spaced apart and parallel to one another and located between said intake and outlet means in said chamber means, and with their opposite edges being free and directed towards said ducting means, said damper blade means, when swung together lying parallel side by side in closely overlying relation and substantially dividing said transfer chamber means into two parallel duct extensions constituting endwise extensions of said first and second ducts, having central axes that are parallel and spaced apart, whereby transfer of air from one said duct to the other is substantially eliminated and when swung apart, said first blade means moves into the path of said first duct and said second blade means moves into the path of said second duct thereby causing transfer of at least some air from said second duct back into said first duct;
- linkage means interconnecting said damper blade means whereby the same move in unison in opposite directions, and,
- power operated means connected with said damper blade means for moving the same.

8. Vent means as claimed in claim 7 wherein said frame means is attached to said ducting means by hinges along one edge thereof, and including locking means on another said edge whereby the same may be swung to and fro relative to said ducting means and may be locked into position thereon.

9. Vent means as claimed in claim 7 including partition wall means between said first and second ducts at their juncture with said transfer chamber means, said blade means being dimensioned to overlap said partition wall means when swung together thereby dividing said transfer chamber means and forming the same into endwise extensions of said first and second ducts, in communication directly with respective said intake and outlet means.

* * * * *